(12) United States Patent
Raindl

(10) Patent No.: US 9,726,116 B2
(45) Date of Patent: Aug. 8, 2017

(54) GAS MIXER AND GAS MIXING SYSTEM

(71) Applicant: MTU Friedrichshafen GmbH, Friedrichshafen (DE)

(72) Inventor: Markus Raindl, Seifen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 578 days.

(21) Appl. No.: 14/357,997

(22) PCT Filed: Oct. 25, 2012

(86) PCT No.: PCT/EP2012/004450
§ 371 (c)(1),
(2) Date: May 13, 2014

(87) PCT Pub. No.: WO2013/072010
PCT Pub. Date: May 23, 2013

(65) Prior Publication Data
US 2014/0326221 A1 Nov. 6, 2014

(30) Foreign Application Priority Data
Nov. 14, 2011 (DE) .......................... 10 2011 086 321

(51) Int. Cl.
*F02M 21/04* (2006.01)
*B01F 3/02* (2006.01)
(Continued)

(52) U.S. Cl.
CPC ............. *F02M 21/047* (2013.01); *B01F 3/02* (2013.01); *B01F 3/026* (2013.01); *B01F 5/0421* (2013.01);
(Continued)

(58) Field of Classification Search
CPC .... F02M 21/047; F02M 21/042; B01F 3/026; B01F 5/0682; B01F 5/0421; B01F 5/0426; B01F 5/0428; B01F 3/02
(Continued)

(56) References Cited

U.S. PATENT DOCUMENTS 375,175 A * 12/1887 Hess ....................... A01K 69/06
43/100
797,278 A * 8/1905 Harper ................... F02M 21/04
123/527
(Continued)

FOREIGN PATENT DOCUMENTS

| CN | 1399066 A | 2/2003 |
|---|---|---|
| DE | 681375 | 9/1939 |

(Continued)

*Primary Examiner* — Avinash Savani
*Assistant Examiner* — Rabeeul Zuberi
(74) *Attorney, Agent, or Firm* — Lucas & Mercanti, LLP; Klaus P. Stoffel

(57) ABSTRACT

A gas mixer for mixing a first gas and a second gas, having a first, outer gas housing part, having an inlet for the first gas in a longitudinal axis and an inlet for the second gas in a transverse axis, a second, interior gas housing part set into the first gas housing part to form an annular space for a second gas, having a mixing space into which the first gas and the second gas are introduced for mixing. The first and second gas housing parts and the annular space are aligned along the longitudinal axis and the mixing space is aligned cylindrically along the longitudinal axis. A mixing device having a plurality of hollow rods is arranged in the mixing space. A hollow space of a hollow rod is in fluid communication on both sides with the annular space. The number of hollow rods extends transverse to the longitudinal axis and the transverse axis and at least one hollow rod has a (Continued)

plurality of openings for the second gas, so that the hollow space is in fluid communication with the cylindrical mixing space.

22 Claims, 2 Drawing Sheets

(51) Int. Cl.
| | |
|---|---|
| *B01F 5/06* | (2006.01) |
| *B01F 5/04* | (2006.01) |
| *B01F 5/00* | (2006.01) |

(52) U.S. Cl.
CPC .......... *B01F 5/0426* (2013.01); *B01F 5/0428* (2013.01); *B01F 5/0682* (2013.01); *F02M 21/042* (2013.01); *B01F 2005/0094* (2013.01); *Y02T 10/32* (2013.01)

(58) Field of Classification Search
USPC .................. 261/119.2; 123/527; 366/340
See application file for complete search history.

(56) References Cited

U.S. PATENT DOCUMENTS

| | | | |
|---|---|---|---|
| 4,865,820 A | 9/1989 | Dunster et al. | |
| 5,377,646 A * | 1/1995 | Chasteen | F02M 21/042 123/527 |
| 5,908,475 A | 6/1999 | Morris, Jr. et al. | |
| 6,092,364 A | 7/2000 | Stellwagen | |
| 6,679,232 B2 | 1/2004 | Tamamoto et al. | |
| 7,841,322 B2 * | 11/2010 | Bach | F02B 29/0418 123/480 |
| 2006/0060173 A1 | 3/2006 | Wei et al. | |
| 2009/0088950 A1 | 4/2009 | Fisher et al. | |

FOREIGN PATENT DOCUMENTS

| | | |
|---|---|---|
| DE | 8634567 | 2/1987 |
| EP | 0303439 | 2/1989 |
| EP | 0898064 | 2/1999 |
| EP | 2016994 | 1/2009 |
| EP | 2258983 | 12/2010 |
| GB | 154920 | 4/1922 |
| WO | 9629511 | 9/1996 |

* cited by examiner

GAS MIXER AND GAS MIXING SYSTEM

The present application is a 371 of International application PCT/EP2012/004450, filed Oct. 25, 2012, which claims priority of DE 10 2011 086 321.4, filed Nov. 14, 2011, the priority of these applications is hereby claimed and these applications are incorporated herein by reference

BACKGROUND OF THE INVENTION

The invention pertains to a gas mixer comprising: a first, external gas housing part with a feed line for the first gas in a longitudinal axis and a feed line for the second gas in a transverse axis; a second, internal gas housing part, which is inserted into the first gas housing part to form an annular space for a second gas, with a mixing space, into which the first gas and the second gas can be introduced so that they can be mixed to form a gas mixture; wherein the first gas housing part, the second gas housing part, and the annular space are oriented along the longitudinal axis, while the mixing space is oriented cylindrically along the longitudinal axis; and wherein a mixing arrangement consisting of a number of hollow bars is arranged in the mixing space; wherein a hollow space of a hollow bar is fluidically connected at both ends to the annular space. The invention also pertains to a gas mixing system with a gas engine.

A gas mixer of the type described above serves to mix together a first gas and a second gas. Especially in the case of a gas engine, the first gas is in the form of combustion air, that is, fresh air or a lean air/gas mixture—also called "charge air", and the second gas is in the form of a fuel gas. The gas mixer provides an air/fuel gas mixture, consisting of combustion air into which a fuel gas is mixed, suitable for the gas engine. Especially for a lean gas engine, it has been found important to adjust the lambda ratio, namely, the ratio of fuel gas to combustion air—to suit the power demand of the lean gas engine, for example. A gas mixer is described in EP 0 898 064 A1, for example, where it appears in the form of a venturi mixer, which is positioned in a gas mixing system upstream of a lean gas engine to add fuel gas to the combustion air or a lean gas mixture and to mix these two components together.

To increase the mixing quality of the air/fuel gas mixture, it is possible in principle to work with a venturi mixer with different cross sections; EP 2 258 983 A2, for example, describes a mixing section of a venturi mixer provided with different cross sections. GB 154,920 describes a gas mixer of the type previously mentioned with a movable displacement body in a venturi tube, as a result of which a mixing gap can be set to different values. A venturi mixer works on the basis of the venturi principle, on which the mixing of the gases depends; that is, what is essential is to reduce the overall backpressure in the flow by increasing the flow velocity in the area of a displacement body, this displacement body being arranged centrally in the flow to reduce the overall size of the flow cross section. This essential "global" venturi principle is thus based on the use of a central displacement body, which influences, i.e., accelerates, the flow over the entire flow cross section.

EP 2016 994 A describes a gas mixer of the type indicated above, in which a venturi tube comprises inlet openings for the fuel gas in the area of a narrowed cross section; the size of these openings can be varied by control elements during the mixing process. The control elements comprise here a control sleeve, which surrounds the narrowed cross section and has fuel control openings, wherein the size of the pass-through cross sections for the fuel gas can be changed by shifting the position of the fuel control openings with respect to the position of the inlet openings for the fuel gas. The narrowed cross section is formed by a displacement body arranged in the venturi tube. Although it is possible in this way achieve a comparatively precise adjustment of the pass-through cross section, it takes a comparatively long time to execute the corresponding control process, and the maximum allowable actuating force is also limited. In addition, the mechanical design of the previously mentioned control elements is comparatively complicated, which means that the precision with which adjustments can be made will deteriorate over the service life of the gas mixer as a result of wear and possibly the accumulation of dirt.

In addition to a displacement body, which is usually torpedo-shaped, all of the previously mentioned solutions are characterized by an increasingly narrow flow-through opening extending around the displacement body, which is arranged on the center axis. This leads to the maximum possible acceleration of the combustion air in the area of the narrowed flow-through opening and thus produces a high negative pressure across the entire cross section of the narrowed flow-through opening, sufficient to allow the admixture of the fuel gas. This mixing principle, called here the "global" venturi principle, makes use of the venturi effect across the entire cross section of the narrowed flow-through opening, thus making it the primary and essential principle of the mixing process.

The venturi principle generally offers the basic advantage that the quantities of fuel gas and combustion air remain at the same ratio to each other, even if, for the purpose of changing the power output, a throttle valve is adjusted to change the central mass rate-of-flow of the first gas, i.e., the air.

Theoretically, the venturi principle also works loss-free; that is, theoretically, it works without a loss of total pressure. In reality, however, it is found that, in the case of a venturi nozzle, a negative pressure gradient, that is, a pressure difference between the feed of the second gas and the feed of the first gas, attributable to the use of the "global venturi principle", depends on the number of cylinders of the gas engine connected to the gas mixer or on the equivalent volume of the system making use of the gas. For example, it is to be observed that a gas engine with more than a double-digit number of cylinders can cause a total pressure loss at the gas mixer in the double-digit mbars range. A total pressure loss of this type must be compensated regularly by the compressor of an exhaust gas turbocharger, usually installed downstream from the gas mixer; this means that the power produced by the compressor changes with the variation of the total pressure loss, which impairs the overall efficiency of an internal combustion engine equipped with the gas mixer, especially a gas mixing system with a gas engine or the like. This proves to be especially disadvantageous when the second gas is a combustible gas such as natural gas, biogas, or similar type of fuel gas with a highly variable $CO_2$ component and the first gas is charge air or similar type of combustion air.

It is desirable to design a gas mixer in such a way that the compressor of the internal combustion engine is relieved of this load. It is also desirable to have a gas mixer of comparatively simple design which offers a long and reliable service life.

SUMMARY OF THE INVENTION

It is at this point that the invention enters the picture, its goal being to provide a gas mixer which is superior to that according to the prior art. In particular, a gas mixer is to be designed in such a way that it is improved with respect to its total pressure loss. In particular, the total pressure loss of the gas mixer is to remain almost completely immune to changes—even when the number of cylinders connected to it changes or when some other working volume of a downstream combustion system changes. The goal of the invention is also to provide an improved system with a gas mixer, especially a gas engine or other type of internal combustion engine equipped with a gas mixer.

The goal with respect to the gas mixer is achieved by a gas mixer of the type indicated above, in which, according to the invention, the set of hollow bars extends transversely to the longitudinal axis and transversely to the transverse axis, and at least one hollow bar comprises a plurality of through-openings for the second gas so that the hollow space.

In concrete terms, the invention proceeds from a gas mixer in which, in the mixing space, a mixing arrangement consisting of a number of hollow bars is arranged, wherein the hollow space of the hollow bar is fluidically connected at both ends to the annular space. The invention is based on the reasoning that, in a departure from the globally applied venturi principle for the mixing process, a local mixing principle has proven to yield better results in the sense that it makes the gas mixer largely immune to total pressure losses. The invention has recognized that, to achieve the goal, a concept can be more successful which—in contrast to the global venturi principle explained above—accepts a higher backpressure but also makes available a larger cross section for the inflow of the second gas into the flow of the first gas. The invention has recognized that this concept, based on the "local venturi principle", significantly reduces inflow losses, especially the losses which occur on the transfer of the second gas into the first gas; that is, the loss coefficient of the gas mixer is reduced. The invention has recognized that, in a real-world application, a considerable portion of the total pressure loss, i.e., a considerable loss of efficiency, is attributable not primarily to an insufficient decrease in the static pressure but rather, on the contrary, to the excessive transfer loss which occurs when the global mixing principle is optimized, which therefore outweighs the advantages. To implement the concept of a local mixing principle, it is provided according to the invention that at least one hollow bar comprises a plurality of pass-through openings for the second gas, so that the hollow space is fluidically connected to the cylindrical mixing-space fluid. All of the hollow bars of the set of hollow bars preferably extend transversely to the longitudinal axis and transversely to the transverse axis.

According to the concept of the invention, the set of hollow bars is used to construct a mixing arrangement, by means of which a plurality of pass-through openings can be distributed over the entire flow cross section in the mixing space of the housing part. The hollow bars of the mixing arrangement are not meant to exert a global influence on the flow; quite the reverse: they have only a small inflow cross section facing the flow, which therefore has only a local effect on the flow. Because of this local restriction, the venturi principle goes into effect only locally. Because of this "local venturi principle" in the area of the plurality of through-openings in the hollow bar, only a local scavenging gradient is made available, which is enough to ensure sufficient mixing of the second gas with the flow of the first gas but at the same time makes the mixer less susceptible to the pressure losses resulting from a downstream combustion chamber or the like. As a result of the local venturi principle, there is little global acceleration of the combustion air, because the flow-through opening is narrowed in practice to only an in significant degree by the hollow bars or is narrowed only theoretically, which excludes the occurrence of a significant global influence on the flow velocity. Nevertheless, the venturi principle acts locally in the immediate vicinity of the inflow surface of the hollow bar and of the plurality of pass-through openings provided near the inflow surface.

According to the concept of the mixing arrangement, the "local venturi principle" realized in this way as a mixing principle offers the advantage—arising from the inflow surfaces distributed over practically the entire cross section of a mixing space with adjacent venturi nozzle-like pass-through openings—that the blending of the second gas into the flow of the first gas proceeds in a highly homogeneous manner. The advantageous result is the homogeneous blending of the second gas into the first gas and thus the production of an especially homogeneous gas mixture in a mixing space which is nevertheless small and simple in design.

The concept of the invention increases the overall surface area of the through-openings for the second gas into the first gas, even though they are distributed in a decentralized manner, which is to say that the surface area of pass-through openings leading from the annular space into the mixing space can be increased and adapted to the concrete application. At the same time, as a result of a considerably lower scavenging gradient and a practically insignificant restriction of the flow-through cross sections in the mixing space, the backpressure is greater than that observed when the "global venturi principle" is applied. This solution makes the total pressure loss of the gas mixer much less vulnerable to outside influences and leads to a much more homogeneous gas mixture. The concept is comparatively easy to realize and proves to be less expensive than a gas mixer with a central venturi nozzle. In comparison to a global venturi mixing principle, the concept of the invention can provide mixing sections which are comparatively short but still large in cross section.

Advantageous elaborations of the invention can be derived from the subclaims, which describe in detail additional preferred possibilities for elaborating the concept of the invention which offer additional advantages within the scope of problem to be solved.

It is especially preferable for the mixing arrangement to be mirror-symmetric with respect to a first central plane containing the transverse axis and the longitudinal axis and also mirror-symmetric with respect to a second central plane perpendicular to the transverse axis. In other words, it has been found advantageous to design the mixing arrangement without point symmetry. The elaboration achieves the advantageous result that, when the second gas is being supplied from the direction of the transverse axis, the second gas has the same pressure amplitude at both ends of the fluid connection of the hollow bar to the annular space. This leads advantageously to a uniform inflow of the second gas into the hollow bar at both ends, i.e. with the same flow and pressure amplitude at both ends. It has turned out to be especially advantageous for the hollow bar to be oriented so that it is perpendicular to the transverse axis. In this case, the pressure amplitudes at the two ends of the hollow bar will be especially well balanced. Nevertheless, depending on the application, it can also prove to be suitable for the hollow bar to be tilted out of the perpendicular orientation but still be basically transverse to the transverse axis. It is preferable for the deviation from the perpendicular orientation to the transverse axis not to exceed 30°.

A straight hollow bar has been found to be especially advantageous. According to a modified elaboration, however, it can also be advantageous for the hollow bar to have a design which deviates from an exclusively straight line.

At least one hollow bar of the set of hollow bars preferably extends through the mixing space along a secant, which means that it is thus off-center from a diameter. Depending on the number of hollow bars, this can apply preferably to two hollow bars, especially to at least two hollows rods of the set. Within the scope of an especially preferred elaboration, all of the hollow bars are off-center from a diameter of the mixing space and thus extend along secants through the mixing space.

Under consideration of the especially preferred two-fold mirror symmetry of the mixing arrangement described above, the previously mentioned variant of an elaboration has been found to be especially advantageous, especially when an even number of hollow bars is present. In particular, the mixing arrangement has no hollow bar in the center in this case.

In another variant of an elaboration, especially in the case of an odd number of hollow bars, it has been found advantageous for only a single, central hollow bar of the set of hollow bars to extend transversely to the longitudinal axis and transversely to the transverse axis and centrally along a diameter of the mixing space. Within the scope of this other variant, it is possible, for example, to provide only a single, central hollow bar or—under consideration of the previously mentioned two-fold mirror symmetry—an odd number of hollow bars such as three, five, six, seven hollow bars, etc.

In principle, the number of hollow bars in the gas mixer can be determined ahead of time as a function of the number of cylinders of the gas engine or similar type of working or internal combustion machine. Overall it has proven to be advantageous for the number of hollow bars to be between four and twelve. In particular it has been found advantageous for the number of hollow bars to increase with the number of cylinders of the gas engine; in other words, the larger the working volumes connected to the gas mixer, the larger the number of hollow bars. It has been found advantageous for the overall surface area of the through-openings for the second gas between the cylindrical mixing space and the annular space to be comparatively large in order to keep the inlet pressure, that is, a pressure level of the second gas being supplied to the gas mixer, as low as possible. Whereas it is therefore basically advantageous to increase the backpressure of the first gas and the inflow surface for the second gas, it has also been found to be advantageous according to this elaboration for the inlet pressure of the supplied second gas to be kept as low as possible.

It has also been found to be advantageous for the hollow bar to comprise a first plurality of through-openings on the top side and a second plurality of the through-openings on the bottom side. This advantageously increases the flow-through surface area for the second gas. At the same time, the spacing of the through-openings for the second gas is decreased. Reducing the spacing between the openings leads to an especially advantageous, homogeneous mixing of the first and second gases. This elaboration is based on the idea of the molecular mixing section, which is defined as the shortest free path between, for example, a molecule of the fuel gas (second gas) and, for example, a molecule of charge air (first gas); the shorter the distance between adjacent through-openings, the more likely it is that it will be only insignificantly larger than the molecular mixing section. In other words, the closer the spacing of the through-openings to the size of the molecular mixing section, the more homogeneous the gas mixing and the smaller the space occupied by the gas mixer.

Following the concept of this elaboration, it has been found to be especially advantageous for a plurality of through-openings to be distributed along the entire length of the hollow bar, preferably with equal spacing. In other words, it is advantageous to use the entire length of the hollow bar to accommodate the plurality of through-openings. For example, a plurality of through-openings can be distributed in a single row or in several rows, and the openings could also be offset from each other, as needed.

Within the scope of a mixing arrangement supporting the uniform mixing of the first and second gases, it has been found to be especially advantageous for at least one first and one second hollow bar to be oriented in the same direction, especially in plane-parallel fashion. In other words, a geometrically exact plane-parallel orientation has proven to be especially preferred; slight deviations from this exact geometric arrangement within the scope of a basically similar orientation of the hollow bars has also proven possible, depending on the purpose of the application. It has been found to be especially advantageous for all of the hollow bars of the set of hollow bars to have the same orientation or to be arranged in plane-parallel fashion.

The annular space, arranged in particular downstream of an inlet orifice to supply the second gas to the mixing space, can preferably be connected directly to the mixing space by additional through-openings for the second gas. In particular, the additional through-openings can be arranged upstream of the plurality of through-openings in the hollow bars. These elaborations advantageously increase the total flow-through surface area for the second gas flowing to the mixing space. In particular, an upstream arrangement of these additional through-openings in front of a downstream arrangement of through-openings in the hollow bars takes advantage of the combination of the mixing behavior from a radial direction and the mixing behavior from a secant direction in the cross section of the flow.

Within the scope of an especially preferred elaboration, the placement of the plurality of through-openings for the second gas and the geometric design of the hollow bars can both be improved with respect to the flow behavior and the mixing behavior.

In particular, the hollow bar of the set of hollow bars can be designed in the form of a flat bar; a flat bar with the profile of a box can be manufactured comparatively easily. One of the narrow sides of the flat bar preferably has an inflow cross section which preferably has only a local effect on the flow behavior. The flat side of the flat bar is preferably parallel to the longitudinal axis.

The size of the narrow side of the flat bar is designed to produce a sufficiently small amount of displacement, so that, according to the previously explained general concept, a high backpressure can be maintained. The narrow side of the flat bar is not at the service of a "global venturi principle". Instead, the narrow, upstream side of the hollow bar with an inflow surface in the form of, for example, a half-rounded shape serves to create a flow stagnation point, which to this extent is able to realize only a "local venturi principle"; in particular, the inflow surface is free of through-openings. For example, a hollow bar can comprise a rectangular profile with a half-round leading edge.

A flow guide surface proceeding from the narrow, upstream side of the hollow bar to the flat side and adjoining the inflow surface should preferably comprise the plurality of through-openings. In the area of the flow guide surface, it can be assumed, namely, that the gas is still flowing directly over a surface of the flat bar; therefore, given the plurality of through-openings, a local venturi principle comes into play, and thus the inflow surface is capable of producing a local negative pressure in the flow guide surface, that is, in the area of the plurality of through-openings.

It is also preferable for a flow separation surface, which proceeds further downstream along the flat side of the hollow bar and adjoins the flow guide surface, to be free of through-openings. The absence of through-openings from both the inflow surface and the flow separation surface offers the advantage that the first gas is reliably prevented from penetrating into the area where the second gas is being introduced into the mixing space.

In concrete terms, the plurality of through-openings can be arranged advantageously in an area of the flow guide surface of the flat side located upstream of a center line perpendicular to the flat side. For example, the plurality of through-openings can be arranged in a row, e.g., essentially close to and at equal distances from each other, parallel to an upstream side edge (e.g., the boundary between the narrow, upstream side and the flat side) of the hollow bar. The exact number and surface area of a through-opening—and thus also the spacing of the openings—can be adjusted according to the total inflow surface area to be achieved for the second gas and according to the extent to which it is desired to reduce the transfer losses of the second gas into the first gas. A "side edge" is to be understood as the boundary line between the half-rounded portion and the planar surface of the flat side of the hollow bar.

Exemplary embodiments of the invention are now described below on the basis of the drawing and in comparison with the prior art, some of which is also illustrated. The drawing does not necessarily represent the exemplary embodiments to scale; on the contrary, where useful for the purpose of explanation, it is executed in schematized and/or slightly distorted form. With respect to information going beyond the teachings directly derivable from the drawing, reference is made to the relevant prior art. In this regard, it should be kept in mind that many different modifications and changes pertaining to the form and the details of an embodiment can be made without departing from the general idea of the invention. The features of the invention disclosed in the description, in the drawing, and in the claims can be essential both individually and in any desired combination to the elaboration of the invention. In addition, all combinations of at least two of the features disclosed in the description, the drawing, and/or the claims fall within the scope of the invention. The general idea of the invention is not limited to the exact shape or to the details of the preferred embodiment illustrated and described below, nor is it limited to an object which might be limited in comparison to the object claimed in the claims. In the case of the stated dimensional ranges, values lying within the stated limits are also to be disclosed as boundary values and usable and claimable as desired. Additional advantages, features, and details of the invention can be derived from the following description of the preferred exemplary embodiments and from the drawing:

DETAILED DESCRIPTION OF THE INVENTION

Figure 1:
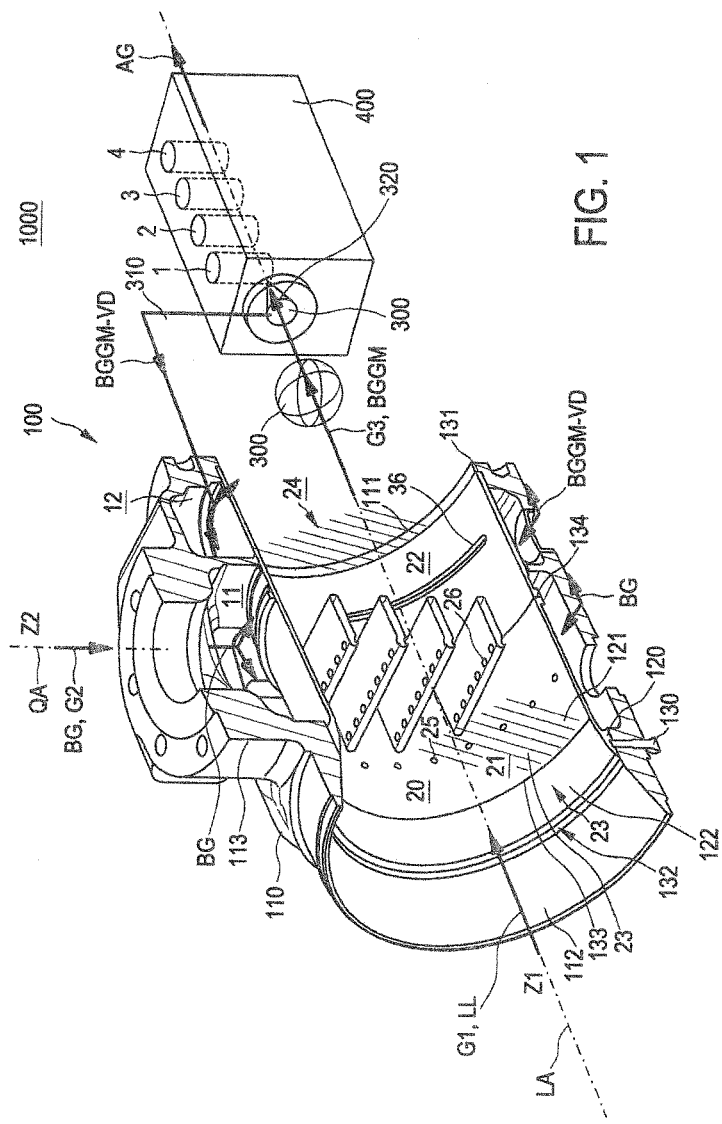
FIG. 1 shows a perspective partial view of a gas mixing system with a gas engine and a gas mixer of a preferred embodiment, which comprises a mixing arrangement designed according to the concept of the invention in a mixing space.

FIG. 1 shows a gas mixing system 1000 with a gas mixer 100 for mixing a first gas G1—in the present case, charge air LL—and a second gas G2—in the present case a fuel gas BG for a gas engine 400. The gas mixture G3 formed by the first gas G1 and the second gas G2—here the fuel gas mixture BGGM—is sent to a compressor 300 and then finally in compressed form to an internal combustion engine, which in the present case is illustrated symbolically by the gas engine 400 with its cylinders 1, 2, 3, 4. The fuel gas mixture BGGM burned in the gas engine 400 to produce work is discharged as exhaust gas AG into an exhaust gas return line and then into the environment, possibly via an exhaust gas post-treatment unit, not shown. In the present embodiment, it is shown that the gas mixer 100 is part of a high-pressure return line 310. A pressure regulator 320 serves here to manage the output of the gas engine 400 and, in a manner not shown in detail, branches off a compressed portion of the compressed fuel gas mixture BGGM-VD downstream from the compressor 300 into the high-pressure return line 310 and thus back to the gas mixer 100. The compressed fuel gas mixture BGGM-VD can be supplied via the gas mixer 100 back to the fuel gas mixture BGGM again upstream of the compressor 300.

The housing of the gas mixer 100 has a first, outer housing part 110 and a second, inner housing part 120. The first and second housing parts 110, 120 are connected to each other by screw joints 130 and positive-locking connections 131 in such a way that the second housing part 120 is firmly seated in the first housing part 110. The charge air LL is introduced in the direction of the longitudinal axis LA of the gas mixer 100 from a first feed line Z1 into a mixing space 20, which is formed in the first housing part. The first gas G1, furthermore, is supplied through a feed part 112 arranged on the first housing part 110 upstream of the mixing space 20, wherein the first feed part 112 merges smoothly and continuously with a second feed part 122 of the second housing part 120. The feed orifice 132 formed by the first and second feed parts 112, 122, finally, is connected to the geometrically cylindrical mixing space 20 in the second housing part 120 by way of an edge 133.

Between the first and second housing parts 110, 120 there is an annular space 11, which surrounds the mixing space 20, is separated from it, and is fluidically connected to it by fluid connections. The second gas G2 in the form of the fuel gas BG can be introduced into this annular space from a second feed line Z2. The connection of the second feed line Z2 to the first housing part 10 is achieved by way of a ring flange 113. The second gas G2 is introduced along a transverse axis QA, arriving first in the previously mentioned annular space 11, from which it proceeds via the fluid connections, formed as through-openings, into the mixing space 20. In the present case, both the annular space 11 and the mixing space 20 are oriented along the longitudinal axis LA, wherein the mixing space is cylindrical in shape and is surrounded in a ring-like manner by the annular space 11. The annular space 11 extends along the longitudinal axis LA over only a part of the length of the mixing space 20.

The mixing space 20 itself is formed geometrically as a straight cylinder with a circular cross section 23, oriented along the longitudinal axis LA. The surface area of the cross section 23, drawn here at the entrance to the mixing space 20, does not change as one proceeds along the longitudinal axis LA from the entrance of the mixing space 20 to a cross section 24 at the exit; along the longitudinal axis LA, the mixing space 20 therefore has an essentially constant diameter. The cross sections 23, 24 along the longitudinal axis LA are bounded by a wall 121 of the second housing part 120. In the present case, the second housing part 120 is assembled from a first cylindrical sleeve, which forms the first part 21 of the mixing space 20, and a second cylindrical sleeve, which forms the second part 22 of the mixing space 20, wherein the cylindrical sleeves abut each other in positive fashion at an annular shoulder 134. The cross section is constant over both the first part 21 of the mixing space 20 and the second part 22 of the mixing space. The second part of the mixing space serves to supply the compressed fuel gas mixture BGGM-VD from a second annular space 12, which is connected to the high-pressure return line 310. Downstream from the mixing space 20, the first housing part 110 forms a discharge orifice 111, which, in the present case, forms the boundary of a cross section 24, which is neither constricted nor expanded, at the exit from the mixing space 20. The cross section 24 at the exit therefore merges smoothly and continuously with the downstream guide for the gas mixture G3, that is, the fuel gas mixture BGGM, in the second part 22 of the mixing space 20.

The returned portion of the compressed fuel gas mixture BGGM-VD is supplied to the second part 22 of the mixing space 20 by way of an essentially circumferential fluid connection in the wall 121 of the second cylindrical sleeve of the second housing part 120—here a circumferential slot in the form of an elongated hole 36. The feed of the fuel gas BG from the annular space 11 to the first part 21 of the mixing space 20 proceeds by way of circumferential bores in the form of round holes 35. Through the oblong holes 36 and the round holes 35, the compressed fuel gas BGGM-VD and the fuel gas BG can be supplied in the radial direction to the mixing space 20. The slot-like design of the fluid feed openings in the second part 22 of the mixing space 20, that is, the oblong holes 36, serves to expand the compressed fuel gas mixture BGGM-VD as it is being introduced. The smaller design of the round holes 35 arranged around the circumference of the first part 21 ensures that the fuel gas BG will be injected radially into the mixing space 20 at a sufficiently high pressure. The annular space 11 for supplying the second gas G2 to the mixing space 20 arranged downstream of the feed orifice 132 is connected directly to the mixing space 20 by way of the additional pass-through openings 25 for the second gas G2 designed as round holes 35.

Figure 2:
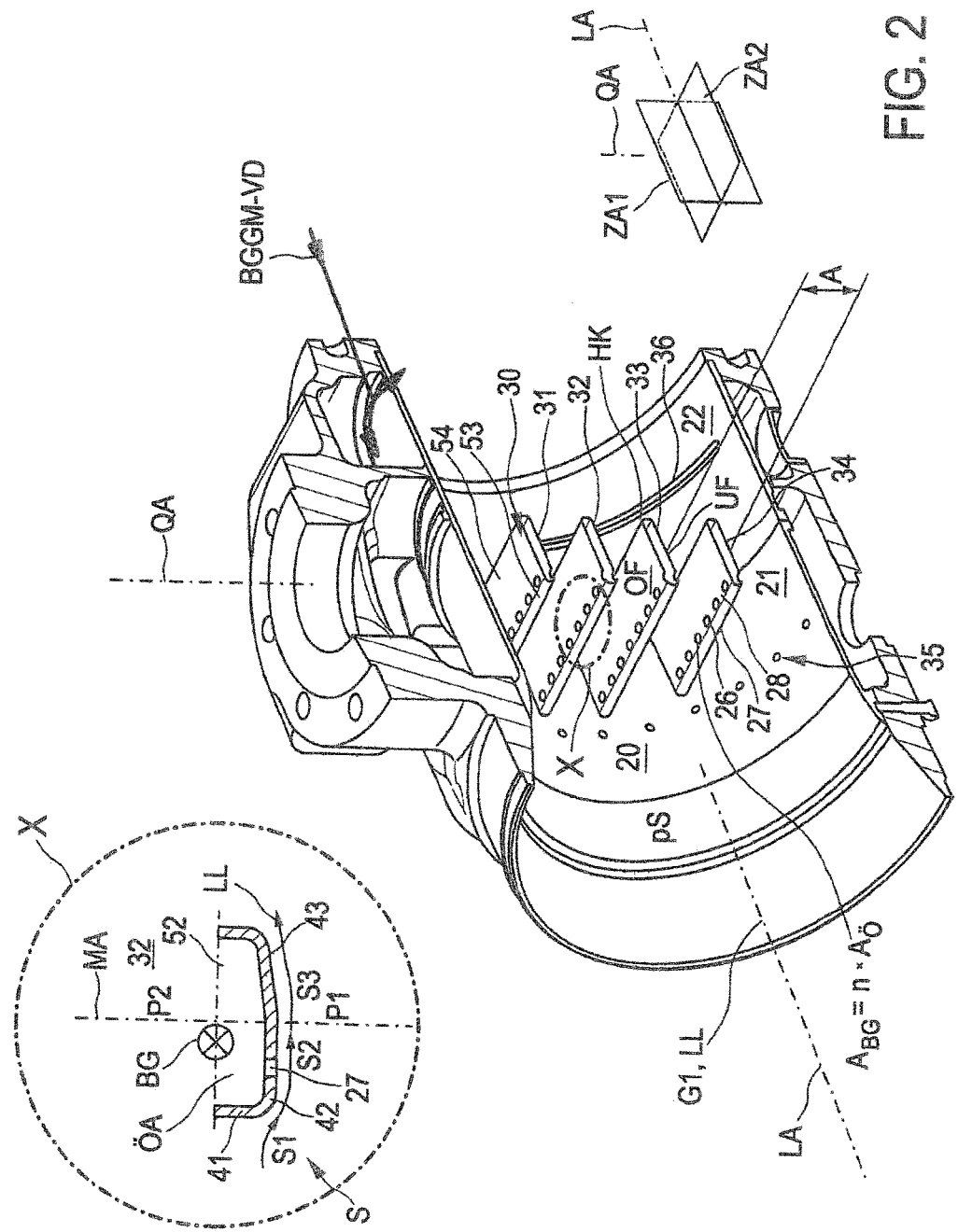
FIG. 2 shows a perspective partial cross section, in perspective, of the gas mixer and a detailed view illustrating the local venturi principle serving as the functional principle of the mixer.

As can be seen in FIG. 2, the additional through-openings—designated here by the number 25—are formed upstream of a plurality of through-openings 26, 27, the function of which is illustrated in FIG. 2 and also in detail X of FIG. 2.

FIG. 2 shows that a mixing arrangement 30 consisting of a set of hollow bars 31, 32, 33, 34, all of which extend transversely to the longitudinal axis LA and transversely to the transverse axis QA, is arranged in the mixing space 20, namely, in the first part 21 of the mixing space 20. In the present case, these are the hollow bars 31, 32, 33, 34, which together form the mixing arrangement 30. With respect to the arrangement of the hollow bars 31, 32, 33, 4, the mixing arrangement 30 is mirror-symmetric to a first central plane ZA1 containing the transverse axis QA and the longitudinal axis LA and also mirror-symmetric to a second central plane ZA2 perpendicular to the transverse axis. In particular, each of the hollow bars 31, 32, 33, 34 is formed as a flat, hollow section with a rounded leading edge, the "leading edge" being the narrow, upstream side 53, the inflow surface 41 of which faces the incoming flow S. Each of the hollow bars 31, 32, 33, 34 with its flat design also comprises a top flat side OF and a bottom flat side UF, all of these sides being plane-parallel to the second central plane ZA2. A trailing edge HK of a hollow bar 31, 32, 33, 34 is essentially rectangular in design in conformity with the rectangular profile. The leading edge VK comprises the inflow surface 41 with a half-round configuration, as shown more clearly in detail X.

FIG. 2 shows only the gas mixer 100 of the gas mixing system 1000, wherein the same reference symbols are used to designate parts which are the same or similar and also to designate parts which have the same or a similar function; the mixing arrangement 30 according to the "local venturi principle" explained above, furthermore, is designed as the essential mixing principle of the gas mixer 100 and is described on the basis of FIG. 2. In regard to the other parts of FIG. 2, reference is made to the description of the identical parts shown in FIG. 1.

The leading edge VK of the narrow side 53 of a hollow bar 31, 32, 33, 34 with its flat design is provided with an inflow surface 41, which has only a local influence on the course of the flow of the charge air LL. Adjoining the inflow surface 41 of the hollow bar 32—which is shown in detail X by way of example for all of the rods as a symmetrical cross section through its profile—is a flow guide surface 42 and, further downstream, a flow separation surface 43. The flow S of the charge air LL along the surface of the hollow bar 32 with its flat design is shown by way of example in the detailed drawing. It can be seen from this that a first part S1 of the flow S arrives at the inflow surface 41, and a second part S2 of the flow S, theoretically laminar, proceeds closely along the flow guide surface 42. Depending on the details of how the profile of the flat bar is designed and on the concrete flow parameters of the flow S, a flow separation surface 43 for a separated flow S3 is formed in the downstream part of the profile. Under consideration of the "local venturi principle", the flow guide surface 42 is especially suitable for producing a local negative pressure in the flow S2 in the area of a through-opening 27, shown here by way of example. Whereas a pressure P2 is therefore present in the hollow space 52 of the hollow bar 32, a pressure P1 is present at the immediate outside surface of the hollow bar. Pressure P2 is less than pressure P1, which therefore ensures that the fuel gas BG will enter the air flow of the charge air LL through the opening 27 (and not vice versa).

As can be seen in detail in FIG. 2, each of the hollow bars 31, 32, 33, 34 is provided with a first plurality of through-openings 26 on the top flat side OF and with a second plurality of through-openings 27 on the bottom flat side UF. The through-openings 26, 27 are distributed in a single rows along the entire length of the hollow bar 31, 32, 33, 34 and in the present case are spaced equally apart. The rows of through-openings 26, 27—as can be seen in Detail X—are arranged in the area of the flow guide surface 42. When the axes ÖA of the through-openings 26, 27 are compared to the center axis MA of the hollow bar 32, it can be seen that the through-openings 26, 27 are arranged in the area of the flow guide surfaces 42 of the flat sides 54—specifically the sides OF, UF—which lies upstream of the center perpendicular MA to the flat sides 54. In the present embodiment, the axes ÖA of the openings of the plurality of through-openings 26, 27 are located approximately in the middle, i.e., between the side edge 28 (the side edge 28 between the flat side 54 and the narrow side 53) and the center perpendicular MA of the hollow bar 31, 32, 33, 34. This placement has been found to be especially advantageous for the present embodiment as a way of realizing the "local venturi principle", because the flow S2 is still being guided by the profile of the hollow bar 32; that is, it has still not been separated, as part S3 of the flow S has become in the area of the flow separation surface 43. A negative pressure is thus produced especially effectively in the area of the partial surface S2

According to the present embodiment with the plurality of n through-openings 25, 26, 27, the end result is that the total surface area $A_{BG}$ of all the individual outlet opening areas $A_Ö$ for the fuel gas BG proceeding from the annular space 11 to the mixing space 20 is comparatively large; the flow pressure $p_S$ at the mixing arrangement 30 is very high in comparison to that observed in connection with a global venturi principle. This leads to a comparatively low total pressure loss of the mixing arrangement 30 in the gas mixer 30, which is considerably below that of a gas mixer operating on the global venturi principle. The reason for this is that the present embodiment does not make any attempt to exert a global influence on the flow S—such as by means of a central displacement body acting as a venturi element. It is found that, with the present mixing arrangement 30 in the gas mixer 100, it is also possible to achieve an improvement in the knocking behavior and emissions behavior of an internal combustion engine, especially a gas engine 400. The design of the mixing arrangement 30 in the gas mixer 100 also has the effect of creating a gas mixture G3 in which the first and second gases G1, G2 are mixed in an especially homogeneous way, which advantageously influences the operating bandwidth of the gas mixer 100 and thus the load switching capacity of the gas engine 400. In particular, the number of hollow bars—four hollow bars 31, 32, 33, 34 in the present case—can be selected as a function of the number of cylinders 1, 2, 3, 4 of the gas engine 400. The ratio—here it is 1:1—of the number n of hollow bars to the number of cylinders is to be understood in the present case only as an example and in a real-world application is usually less than 1:1; that is, the number of cylinders usually is greater than the number n of hollow bars. Another advantage is that the spacing A of the hollow bars 31, 33, 33, 34 can be selected in such a way that, under the assumption that the fuel gas BG is injected suitably through the through-openings 26, 27 with spacing A, the distance between openings comes relatively close to the dimensions of a real mixing section (understood as the shortest distance between the molecules of the fuel gas BG and the molecules of the charge air LL under the given flow conditions), or is only slightly larger. In other words, the spacing A can be reduced in such a way that the length of the mixing space 20 along the longitudinal axis LA can be relatively short while still being able to guarantee a homogeneous and especially good mixing of the fuel gas BG and the charge air LL.

The gas mixer 100 presented here is advantageously comparatively simple in design and is therefore suitable for a wide variety of different applications with a wide operating bandwidth. In particular, it has been found to be unnecessary in the case of the present embodiment to provide additional control elements for regulating the gas flow rates. These elements—such as those known from the prior art described above—turn out to have a limiting effect on the operating safety and long-term operational reliability of a gas mixer 100. At the same time, modifications (not shown here) are also possible according to which an orifice design or a different fuel gas control design can be provided to regulate the rate at which the fuel gas BG is supplied via the feed line Z2; a control design could also be applied to regulate the flow rate in the annular space 11 or to regulate the flow rate of the fuel gas BG as it passes through the through-openings 25, 26, 27.

LIST OF REFERENCE SYMBOLS 11 annular space
12 second annular space
20 mixing space
21 first part of the mixing space
22 second part of the mixing space
22, 24 cross section
25, 26, 27 through-opening
28 side edge
30 mixing arrangement
31, 32, 33, 34 hollow bar, especially a flat bar
35 round hole
36 oblong hole
41 inflow surface
42 flow guide surface
43 flow separation surface
52 hollow space
53 narrow side
54 flat side
100 gas mixer
110 first outer housing part
111 discharge orifice
112 first entrance part
113 ring flange
120 second inner housing part
121 wall
122 second entrance part
130 screw joints
131 positive-locking connection
132 entrance orifice
133 edge
134 annular shoulder
300 compressor
310 high-pressure return line
320 pressure regulator
400 gas engine
1000 gas mixing system
A spacing
AG exhaust gas
BG fuel gas
BGGM fuel gas mixture
BGGM-VD compressed fuel gas mixture
G1 first gas
G2 second gas
G3 gas mixture
HK trailing edge
LA longitudinal axis
LL charge air
MA center perpendicular
n number
OF top flat side
UF bottom flat side
ÖA axis of the opening
P1 pressure
P2 pressure
$p_S$ flow pressure
QA transverse axis
S flow
S1 first part of the flow
S2 second part of the flow S3 separated flow
UF bottom flat side
VK leading edge
Z1 feed line
Z2 feed line
ZA1 first central plane
ZA2 second central plane

The invention claimed is:

1. A gas mixer for mixing together a first gas and a second gas, comprising a multi-part gas housing connectable to a gas feed, which housing comprises:
    a first, outer gas housing part, with a feed line for the first gas in a longitudinal axis and a feed line for the second gas in a transverse axis;
    a second, inner gas housing part, which forms an annular space for the second gas and which is inserted into the first gas housing part, the second housing part having a mixing space, into which the first gas and the second gas are introduced so that they are mixed to form a gas mixture, wherein the first gas housing part, the second gas housing part and the annular space are oriented along the longitudinal axis, and the mixing space is oriented cylindrically along the longitudinal axis; and
    a mixing arrangement having a set of hollow bars is arranged in the mixing space, wherein the hollow space of a hollow bar is fluidically connected at both ends to the annular space, wherein the set of hollow bars extends transversely to the longitudinal axis and transversely to the transverse axis; and
    at least one hollow bar comprises a plurality of through-openings for the second gas, so that the hollow space is fluidically connected to the cylindrical mixing space, wherein a hollow bar of the set of hollow bars is formed as a flat bar, wherein a narrow side of the flat bar comprises an inflow cross section which has only a local effect on a course of the flow, and a flat side of the flat bar is oriented parallel to the longitudinal axis and transversely to the transverse axis, wherein a narrow, upstream side of the hollow bar comprises an inflow surface formed as a half-rounding, which comprises a flow stagnation point and is free of a through-opening, wherein a flow guide surface, which extends from the narrow, upstream side of the hollow bar to the flat side and merges with the inflow surface, comprises the plurality of through-openings, and a flow separation surface, which proceeds on the flat side of the hollow bar to the flow guide surface, is free of a through-opening.

2. The gas mixer according to claim 1, wherein the set of hollow bars extends transversely to the longitudinal axis and transversely to the transverse axis so that the mixing arrangement is mirror-symmetric to a first central plane containing the transverse axis and the longitudinal axis and also mirror-symmetric to a second central plane perpendicular to the transverse axis.

3. The gas mixer according to claim 1, wherein at least one hollow bar of the set of hollow bars extends along a secant of a cross section of the mixing space and is thus off-center with respect to a diameter of the mixing space.

4. The gas mixer according to claim 3, wherein all of the hollow bars extend along secants of the cross section of the mixing space.

5. The gas mixer according to claim 1, wherein at least one first and one second hollow bar of the set of hollow bars have a common orientation.

6. The gas mixer according to claim 5, wherein the first and second hollow bars are plane-parallel.

7. The gas mixer according to claim 1, wherein only one central hollow bar of the set of hollow bars extends transversely to the longitudinal axis and transversely to the transverse axis and centrally along a diameter of the cross section of the mixing space.

8. The gas mixer according to claim 1, wherein a hollow bar of the set of hollow bars extends with a uniform bar cross section over an entire cross section along the diameter of the mixing space.

9. The gas mixer according to claim 8, wherein the hollow bar extends with a uniform cross-section over a secant or diameter of the mixing space.

10. The gas mixer according to claim 1, wherein the mixing arrangement has between one and twelve hollow bars.

11. The gas mixer according to claim 1, wherein the mixing arrangement has at least four hollow bars.

12. The gas mixer according to claim 1, wherein the hollow bar comprises a first plurality of through-openings on a top flat side and a second plurality of through-openings on a bottom flat side.

13. The gas mixer according to claim 12, wherein the through-openings are distributed along an entire length of the hollow bar.

14. The gas mixer according to claim 13, wherein the through-openings are equally spaced.

15. The gas mixer according to claim 1, wherein an entrance orifice arranged upstream on the first gas housing part forms a narrowed entrance flow cross section for the first gas, which merges smoothly with the cylindrical mixing space or additionally an exit orifice arranged further downstream forms a discharge flow cross section, which is neither constricted nor expanded, for the mixed first and second gases, which merge smoothly with the downstream guide for the mixed first and second gases.

16. The gas mixer according to claim 1, wherein the annular space for supplying the second gas to the mixing space is connected directly to the mixing space by additional through-openings for the second gas, wherein the additional through-openings are arranged upstream of the plurality of through-openings in the hollow bar.

17. A gas mixer for mixing together a first gas and a second gas, comprising a multi-part gas housing connectable to a gas feed, which housing comprises:
    a first, outer gas housing part, with a feed line for the first gas in a longitudinal axis and a feed line for the second gas in a transverse axis;
    a second, inner gas housing part, which forms an annular space for the second gas and which is inserted into the first gas housing part, the second housing part having a mixing space, into which the first gas and the second gas are introduced so that they are mixed to form a gas mixture, wherein the first gas housing part, the second gas housing part and the annular space are oriented along the longitudinal axis, and the mixing space is oriented cylindrically along the longitudinal axis; and
    a mixing arrangement having a set of hollow bars is arranged in the mixing space, wherein the hollow space of a hollow bar is fluidically connected at both ends to the annular space, wherein the set of hollow bars extends transversely to the longitudinal axis and transversely to the transverse axis; and
    at least one hollow bar comprises a plurality of through-openings for the second gas, so that the hollow space is fluidically connected to the cylindrical mixing space wherein a hollow bar of the set of hollow bars is formed as a flat bar, wherein a narrow side of the flat bar comprises an inflow cross section which has only a local effect on a course of the flow, and a flat side of the flat bar is oriented parallel to the longitudinal axis and transversely to the transverse axis, wherein the plurality of through-openings is arranged in an area of the flow guide surface of the flat side which is upstream from a center perpendicular to the flat side, and the plurality of through-openings is arranged in a row adjacent and parallel to an upstream side edge between the narrow and flat sides of the hollow bar.

18. The gas mixer according to claim 1, wherein the annular space is formed between the second and first gas housing parts, surrounds the mixing space, and extends only over a part of the mixing space in a direction of the longitudinal axis, wherein the cylindrical mixing space is bounded, by a wall of the second housing part extending along the longitudinal axis with an essentially constant diameter, geometrically as a straight cylinder with a circular base and cross section, oriented along the longitudinal axis.

19. A gas mixer for mixing together a first gas and a second gas, comprising a multi-part gas housing connectable to a gas feed, which housing comprises:
   a first, outer gas housing part, with a feed line for the first gas in a longitudinal axis and a feed line for the second gas in a transverse axis;
   a second, inner gas housing part, which forms an annular space for the second gas and which is inserted into the first gas housing part, the second housing part having a mixing space, into which the first gas and the second gas are introduced so that they are mixed to form a gas mixture, wherein the first gas housing art, the second gas housing part and the annular space are oriented along the longitudinal axis, and the mixing space is oriented cylindrically along the longitudinal axis; and
   a mixing arrangement having a set of hollow bars is arranged in the mixing space, wherein the hollow space of a hollow bar is fluidically connected at both ends to the annular space, wherein the set of hollow bars extends transversely to the longitudinal axis and transversely to the transverse axis; and
   at least one hollow bar comprises a plurality of through-openings for the second gas, so that the hollow space is fluidically connected to the cylindrical mixing space, wherein a second, downstream annular space serves as a high-pressure return, and the first, upstream annular space is connected to the mixing space by round holes or the second, downstream annular space is connected to the mixing space by oblong holes, wherein the round holes and the oblong holes are arranged or oriented around a circumference of the mixing space.

20. A gas mixing system comprising: a gas engine with a number of cylinders; and a gas mixer according to claim 1.

21. The gas mixing system according to claim 20, wherein the number of hollow bars is determined in advance as a function of the number of cylinders of the gas engine, and the number increases with the number of cylinders of the gas engine.

22. The gas mixer according to claim 19, wherein the first, upstream annular space is connected to the mixing space by round holes and the second, downstream annular space is connected to the mixing space by oblong holes.

* * * * *